US010535122B2

(12) United States Patent
Sokeila

(10) Patent No.: US 10,535,122 B2
(45) Date of Patent: Jan. 14, 2020

(54) COMPOSITE IMAGE FOR FLASH ARTIFACT REMOVAL

(71) Applicant: Microsoft Technology Licensing, LLC, Redmond, WA (US)

(72) Inventor: Tomi Sokeila, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/660,765

(22) Filed: Jul. 26, 2017

(65) Prior Publication Data

US 2019/0035062 A1    Jan. 31, 2019

(51) Int. Cl.
*G06T 5/00*    (2006.01)
*G06T 5/50*    (2006.01)

(52) U.S. Cl.
CPC .............. *G06T 5/005* (2013.01); *G06T 5/50* (2013.01); *G06T 2207/20221* (2013.01)

(58) Field of Classification Search
CPC combination set(s) only.
See application file for complete search history.

(56) References Cited

U.S. PATENT DOCUMENTS

| | | | |
|---|---|---|---|
| 2004/0150743 A1* | 8/2004 | Schinner | H04N 5/2354 348/371 |
| 2006/0161691 A1 | 7/2006 | Katibian et al. | |
| 2008/0106636 A1 | 5/2008 | Wernersson | |
| 2008/0317379 A1 | 12/2008 | Steinberg et al. | |
| 2009/0123063 A1 | 5/2009 | Ciuc | |
| 2010/0278452 A1 | 11/2010 | Sarkijarvi et al. | |
| 2010/0295959 A1 | 11/2010 | Steinberg et al. | |
| 2011/0242334 A1 | 10/2011 | Wilburn et al. | |
| 2014/0240587 A1 | 8/2014 | Cote et al. | |
| 2015/0063694 A1 | 3/2015 | Shroff et al. | |
| 2015/0092073 A1* | 4/2015 | Park | H04N 5/232 348/218.1 |

OTHER PUBLICATIONS

"International Search Report and Written Opinion Issued in PCT Application No. PCT/US2018/35421", dated Oct. 8, 2018, 10 Pages.

* cited by examiner

*Primary Examiner* — Ruiping Li
(74) *Attorney, Agent, or Firm* — Holzer Patel Drennan

(57) ABSTRACT

A composite image is generated by capturing a sequence of images of a scene over a time interval; pulsing a flash to illuminate the scene multiple times within the time interval; and constructing the composite image from the captured images such that the composite image includes at least a first region constructed from a first subset of the images and a second region constructed from a second subset of the images, the first subset of the images captured sequentially after the second subset of the images.

20 Claims, 6 Drawing Sheets

COMPOSITE IMAGE FOR FLASH ARTIFACT REMOVAL

BACKGROUND

Where flash photography is used to capture images of people and animals, reflections may cause eyes to appear red, gold, or silver. This is due to the fact that human and animal subjects typically have dilated pupils in low ambient light conditions where flash photography is desired. Light emitted from a camera flash enters the eye through the pupil and reflects from the back of the eye, causing a reflection that may be visible in the captured image. The degree of this reflection in an image (e.g., the severity of eye discoloration) is typically proportional to the size of the pupil and tends to worsen when the flash is brighter and/or when the camera flash is closer to the optical axis of the camera. These conditions increasingly apply in modern mobile electronics with cameras and other cameras devices.

SUMMARY

Implementations described and claimed herein provide techniques for flash artifact removal from an image. In one implementation, a method provides for capturing a sequence of images of a scene over a time interval, pulsing a flash to illuminate the scene multiple times within the time interval, and constructing a composite image of the scene. The composite image includes at least a first region constructed from a first subset of the images and a second region constructed from a second subset of the images, where the first subset of the images is captured sequentially after the second subset of the images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

As used herein, the term "flash artifact" refers to reflections in an image that distort the actual appearance of a feature, such as feature distortions due to a camera flash. A "flash image" is an image captured with flash illumination and a "non-flash image" is an image captured without flash illumination. The herein disclosed image capture and processing techniques provide for image enhancement and flash artifact removal. In some implementations, these techniques can be realized over a shorter timescale and/or consume less total power than other existing techniques directed toward the same or similar purpose.

Existing imaging technologies manage flash artifact mitigation in a variety of ways. For example, some image capture technologies pulse an initial flash before capturing an image in order to provoke the pupils of human or animal subjects to contract. Once the pupils have contracted, less light from the flash is able to enter the eye and flash artifacts are mitigated or removed completely. Pulsing the flash in this manner has some disadvantages. For example, flashing the pulse multiple times has the effect of increasing total power consumption during image capture and also may increase the duration of time encompassed by the image capture process as compared to processes that utilize a single flash pulse. In addition, use of multiple flash pulses may cause undesired biological reactions in a subject, such as by causing the subject to blink or become cross-eyed.

Other image capture technologies rely on image processing techniques to detect and remove flash artifacts (e.g., red/gold/silver eye regions), such as by detecting eye regions and artificially refining or altering the color of these regions. However, these solutions tend to result in an unnatural looking image where the subject is depicted with very dark eyes.

Figure 1:
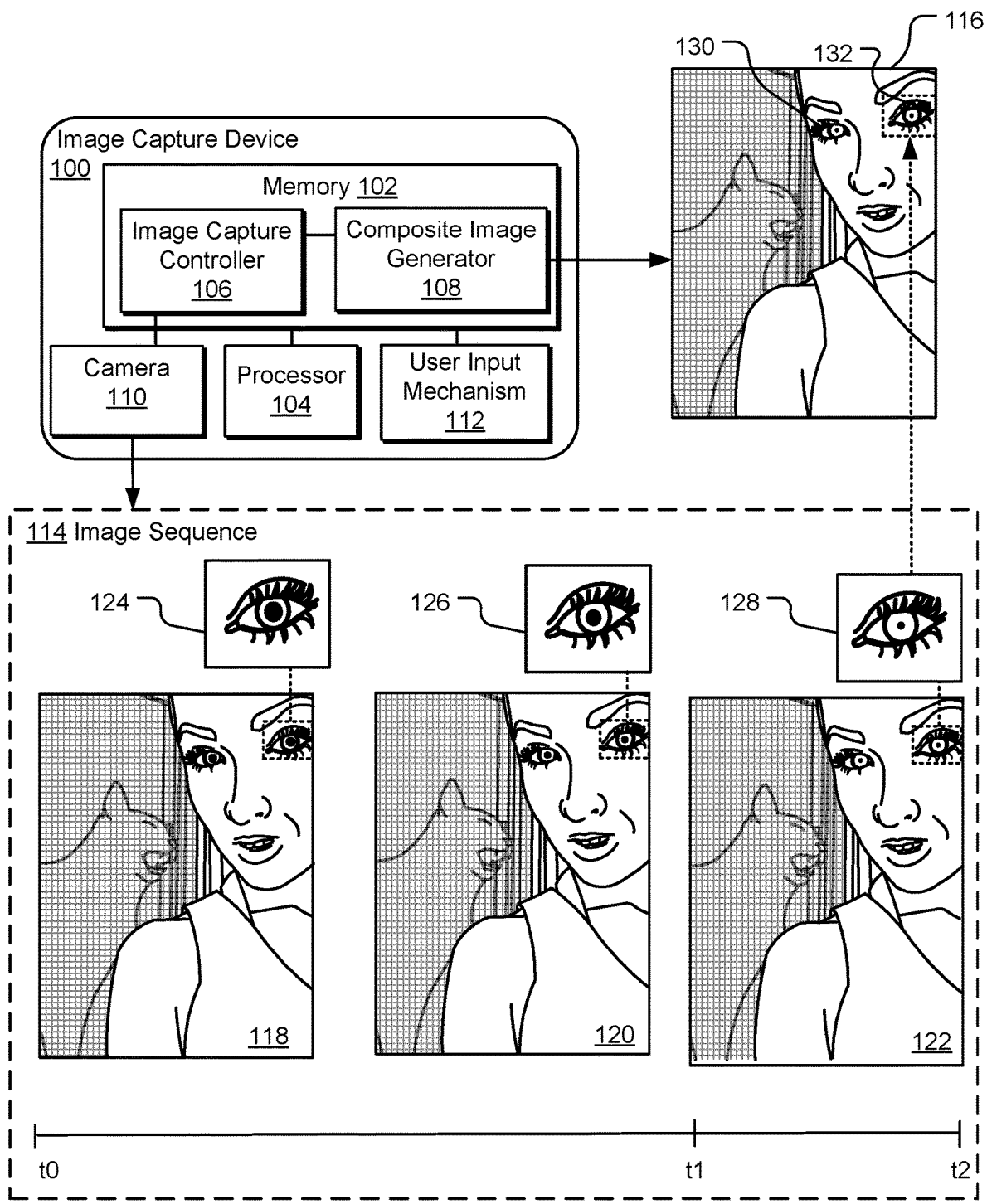
FIG. 1 illustrates an example image capture device that implements techniques for image enhancement and flash artifact removal.

FIG. 1 illustrates an example image capture device 100 that implements techniques for image enhancement and flash artifact removal. The image capture device 100 may be any type of device for image capture that utilizes flash photography including without limitation handheld mobile devices (e.g., tablets, phones, laptops) and photography-specific equipment (e.g., digital cameras).

The image capture device 100 includes a camera 110, a processor 104, and memory 102 for storing various applications executable by the processor 104 such as an image capture controller 106 and a composite image generator 108. The image capture controller 106 sends control signals to the camera 110 to capture images and selectively pulse a flash (not shown) of the camera. In FIG. 1, the image capture device 100 further includes a user input mechanism 112 (e.g., a button, touchpad, microphone, ancillary device input, etc.) for transmitting user instructions to the image capture device 100, such as an instruction to initiate execution of an image capture operation.

In one implementation, the image capture controller 106 executes an image capture operation by capturing a sequence of images 114 (also referred to herein as frames) of a scene in rapid succession. For example, the image capture controller 106 may capture a sequence including 4-8 frames taken at equal intervals, such as at a rate of 30 frames per second. In other implementations, an image capture sequence may include a fewer or greater number of frames taken at a faster or slower rate. The composite image generator 108 subsequently analyzes, processes, and selectively combines frames of the sequence of images 114 to create a composite image 116.

In the simplified example shown, the image capture controller 106 captures three frames 118, 120, and 122 in the order shown (from left-to-right) in rapid succession over a time interval from t0 to t2. During the time interval, a camera flash is pulsed multiple times. The exact timing of the flash pulses may vary relative to frame capture in different implementations, as discussed further with respect to FIGS. 2-5 below. In general, the flash is pulsed at multiple times between the sequence start time t0 and a time t1, marking the start of the final exposure of the sequence of images 114. The flash is also pulsed one final time while the final frame (e.g., the frame 122) is simultaneously captured.

In some implementations, such as an example described with respect to FIG. 2, the multiple flash pulses are timed to occur between the earlier frames of the sequence and to coincide with one or more later frames (e.g., the last frame) of the sequence of images 114. In other implementations, such as an example described with respect to FIG. 3, each of the flash pulses is timed to coincide with a capture of a different frame of the sequence of images 114. As a result, the final frame (e.g., the frame 122) of the sequence of images 114 is a "flash" frame, while the other frames (e.g., the frames 118 and 120) may be captured with or without flash, depending on the implementation.

The composite image generator 108 constructs different regions of the composite image 116 based on the different frames 118, 120, and 122 of the sequence of images 114. The example scene imaged in FIG. 1 includes a human face in a foreground and a cat in the background. In one implementation, background object in the composite image 116 include pixel values derived based on a combination of frames in the sequence of images 114, such as by adding or otherwise combining and/or scaling corresponding pixel values. For example, the pixel values of the cat in frame 118 are added to pixel values of the cat in frames 120 and/or 122 to generate the cat in the composite image 116. This is beneficial because background objects (e.g., the cat shown in FIG. 1) may be too far from the image capture device 100 to be illuminated by the flash. Although longer exposure times may similarly increase the apparent brightness of these background objects, longer exposures are susceptible to blurring due to movement of a live subject in the scene. Combining multiple short exposures can brighten a background object or region without such a blurring effect, provided that the exposures are sufficiently aligned and free of noise.

Foreground objects, in contrast, benefit from flash illumination. The composite image generator 108 therefore reconstructs one or more foreground objects of the captured scene (such as the human face) based on the subset of images in the sequence that are taken with the flash (e.g., the frame 122). In one implementation, one or more foreground objects of the composite image 116 are constructed from the last frame of the sequence of images 114.

In general, pulsing of the flash during the time interval t0 to t1 has the effect of reducing pupil dilation of any human or animal subjects in the scene. For example, a pupil size gradually decreases with time between t0 and t2 such that the pupil is largest in the frame 118 (as shown in magnified view 124), medium-sized in the frame 120 (as shown in magnified view 126), and smallest in the frame 122 (as shown in magnified view 128). As a result, flash artifacts that may distort "eyes" in the scene are absent from the final frame (e.g., the frame 122) of the sequence, which is captured with the flash enabled and after the flash has already pulsed multiple times to reduce pupil dilation. In one implementation, the composite image 116 includes (e.g., eyes 130 and 132) reconstructed using pixels exclusively from the final frame (e.g., the frame 122) of the sequence of images 114. For example, the composite image generator 108 identifies pixels values corresponding to individual eyes present in the frame 122 and inserts these pixels values at corresponding locations in the composite image 116.

As a result of the above-described techniques, the composite image 116 of the scene is free of flash artifacts, has sufficiently bright background objects, and also has one or more flash-illuminated foreground objects.

In addition to advantages realized by the above-described image capture and processing techniques, further advantages can be realized by gradually increasing flash brightness with each pulse between the start time t0 and the end time t2. For example, gradually increasing flash pulse brightness reduces power consumption as compared to implementations relying on pulses of equal brightness while providing approximately the same reduction in pupil dilation. Gradually increasing flash pulse brightness may also reduce the occurrence of undesired biological responses of a subject's eyes. For example, initial flash pulses of lower brightness are less likely to cause a subject to blink or go cross-eyed than a sequence of multiple equally-bright flash pulses.

Although the image capture controller 106 and composite image generator 108 are shown internal to the image capture device 100, other implementations of the disclosed technology may store the image capture controller 106 and/or composite image generator 108 within memory remote from the image capture device 100. Execution of the image capture controller 106 and composite image generator 108 may be performed by either the processor 104 or a processor in another device communicatively coupled to the image capture device 100.

Figure 2:
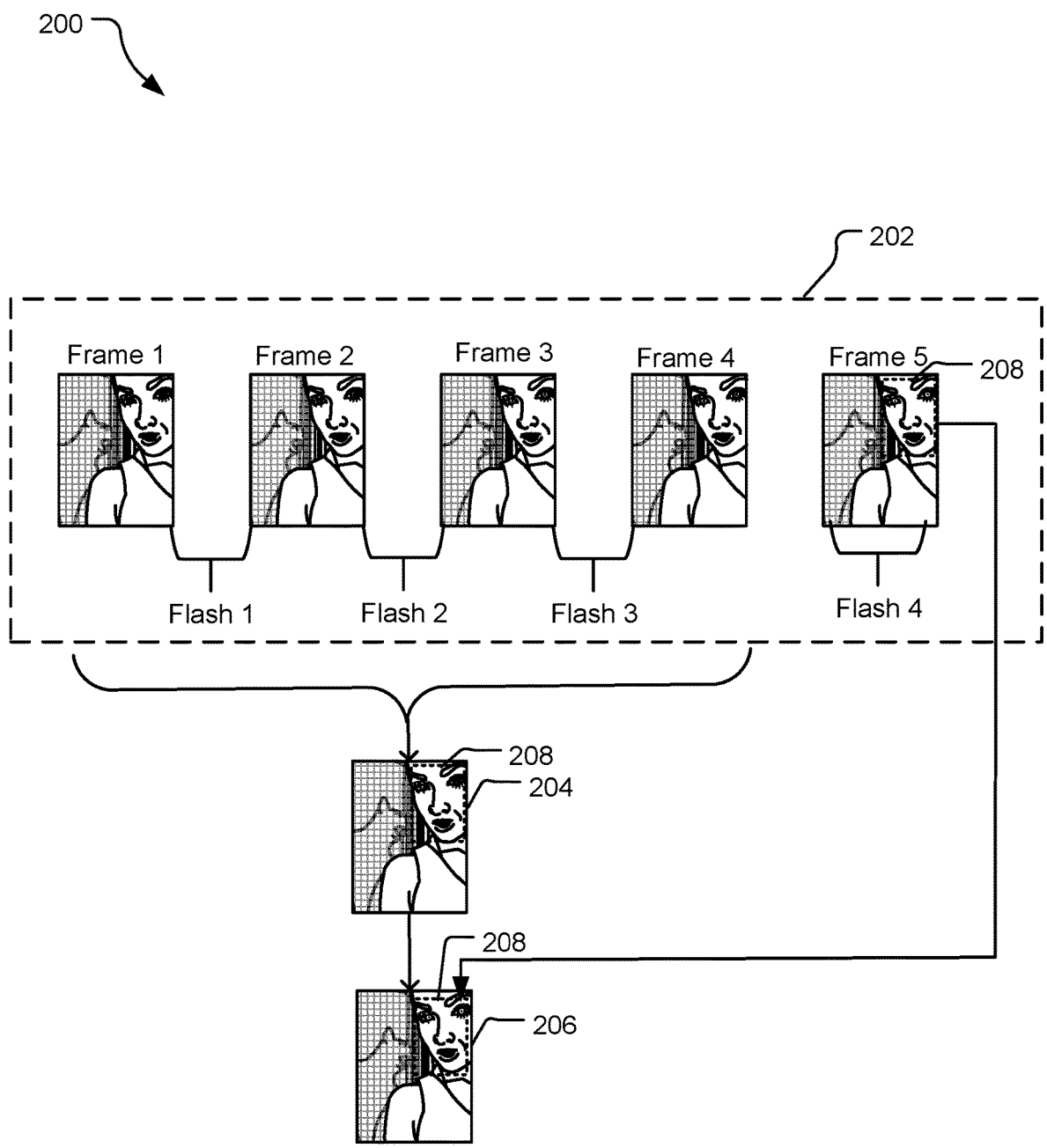
FIG. 2 illustrates operations of an example system for generating a composite image free of flash artifacts from a sequence of images.

FIG. 2 illustrates operations of an example system 200 for generating a composite image free of flash artifacts from a sequence of images 202 of a scene captured in rapid succession (denoted Frame 1-Frame 5). Prior to capturing the sequence of images 202, an image capture controller (not shown) makes an initial determination regarding the use of flash during the exposure of each of the frames. In the example shown, the image capture controller determines not to use a flash when capturing Frame 1, Frame 2, Frame 3, and Frame 4. This determination may be based on a variety of considerations including, for example, relative distances to foreground objects included in the imaged scene. If, for example, foreground objects in the scene are especially close, flash illumination of such objects may look unnatural. For this reason, the image capture controller may elect to forego use of flash photography for some or a majority of images in the sequence of images 202. For reasons explained below, flash is still used when capturing the final frame of the sequence (Frame 5).

In the example shown, the flash is pulsed between capture of Frame 1 and Frame 2 (as denoted by 'Flash 1'), between capture of Frame 2 and Frame 3 (as denoted by 'Hash 2'), between capture of Frame 3 and Frame 4 (as denoted by 'Flash 3'), and during capture of Frame 5 (as denoted by 'Flash 4'). Collectively, Flash 1, Flash 2, and Hash 3 have the effect of reducing dilation of a subject's pupils so that flash artifacts distorting the eyes are not present during capture of Frame 5. Performing the flashes between frames, as shown, prevents the flash from affecting any of Frames 1-4.

In some implementations, the sequential flashes (Flash 1, Flash 2, Flash 3, Flash 4, and Hash 5) are of identical brightness values. In other implementations, the sequential flashes are of gradually increasing brightness values. This reduces power consumption during image capture as compared to implementations using flash pulses of equal brightness. Additionally, the use of pulses of gradually increasing brightness may be less likely to cause the user to blink involuntarily during the capture of Frame 5 as compared to implementations using flash pulses of equal brightness.

After capturing the sequence of images 202 (Frame 1-Frame 5), the composite image generator processes the captured frames to generate an intermediate composite image 204. In the example of FIG. 2, the intermediate composite image 204 is constructed based on the non-flash frames (e.g., Frame 1, Frame 2, Frame 3, and Frame 4). The intermediate composite image 204 may be created using a variety of techniques. In one implementation, the intermediate composite image 204 is created by performing a multi-frame de-noise stacking routine, such as a routine that aligns the various frames, combines corresponding pixels from each frame (e.g., by adding, averaging, or scaling), and removes noise. As a result, background regions of the intermediate composite image 204 may include higher pixel contrast and/or resolution than any single individual one of the frames (Frame 1-Frame 4) used in creating the intermediate composite image 204.

After creating the intermediate composite image 204 from the non-flash frames in the sequence of images 202, the composite image generator performs further operations to refine certain regions of the composite image 204, ultimately outputting a final composite image 206. The final composite image 206 has some regions (e.g., background regions or exceptionally close objects) constructed based on the non-flash frames and at least one other regions (e.g., select foreground regions) constructed based on the flash frames (e.g., Frame 5) of the sequence of images 202.

In different implementations, different techniques may be employed to determine which regions of the scene to reconstruct with flash images and which regions to reconstruct with non-flash images. In general, flash may be preferred for objects in the foreground that are not so close that illumination is likely to appear unnatural. In one implementation, the composite image generator performs an initial calibration to identify one or more foreground regions with objects satisfying a distance threshold (e.g., objects close enough to be illuminated by the flash but not so close as to be unnaturally illuminated). These foreground regions are also referred to herein as "predesignated flash-illumination regions." For example, Frame 5 includes a predesignated flash-illumination region 208, which includes a face. In other implementations, there may simultaneously exist multiple predesignated flash-illuminations regions within the imaged scene. These regions correspond to different foreground objects (e.g., living and non-living) for which flash illumination is determined to be beneficial.

Initial designation of the predesignated flash-illumination region(s), such as the predesignated flash-illumination region 208, may be performed differently in different implementations. In one implementation, the composite image generator identifies these regions during a calibration by comparing histograms to examine relative brightness levels of different regions of an imaged scene under different ambient light conditions. For example, a histogram representing a region of the scene imaged without flash may be compared to a histogram representing the same region of the scene imaged with flash. If the histograms indicate a dramatic brightness increase between non-flash and flash images, the region likely corresponds to a close foreground object. In comparison, foreground objects that are a bit further away but still illuminated by the flash are characterized by less dramatic brightness increases between the non-flash and flash frames. Background objects may not experience any brightness increase between non-flash and flash images. In this way, approximate distance to various objects in the scene can be determined, and distance can be assessed (alone or in conjunction with other criteria) to designate the flash illumination regions for which flash is determined to be beneficial.

After creating the intermediate composite image 204 and identifying the predesignated flash-illumination region 208, a final composite image 206 is created by modifying pixels within the predesignated flash-illumination region 208 of the intermediate composite image 204. In one implementation, the predesignated flash-illumination region 208 of the final composite image 206 includes pixels identical to corresponding pixels within the last frame of the sequence of images 202. For example, pixel values of the flash-illumination region 208 are, in the final composite image 206, identical to corresponding pixel values of Frame 5 in the sequence of images 202. In other implementations, pixel values of the flash-illumination region 208 in the final composite image 206 are based on, but not identical to, corresponding pixel values of the last frame of the sequence of images 202.

In the event that the imaged scene includes a human or animal eye, the pupil of the eye is smaller in the final frame of the sequence (e.g., Frame 5) than in the prior frames due to pulsing of the flash, as described above. In the example shown, Frame 5 includes human eyes free of flash artifacts. The use of pixels from Frame 5 in constructing eye regions of the final composite image 206 therefore eliminates any eye discoloration captured in Frames 1-4 of the sequence of images 202. In addition, the image stacking performed during creation of the intermediate composite image 204 enhances various background regions that are included in the final composite image 206.

In the example of FIG. 2, the sequence of images 202 includes a single flash image (e.g., Frame 5), and the flash illumination 208 of the final composite image 206 is reconstructed from this flash frame. In some implementations, multiple flash images are included in the sequence of images 202, and the predesignated flash-illumination region(s) are constructed from more than one image. For example, eyes of a human subject may be reconstructed from a final image in a sequence while the remainder of a face of the human subject is reconstructed by stacking corresponding pixels from different flash images. In the same or another implementation, one or more of the predesignated flash-illumination region(s) is reconstructed in the final composite image 206 based on an average of pixel values (or other statistical representation) of the flash frames.

Figure 3:
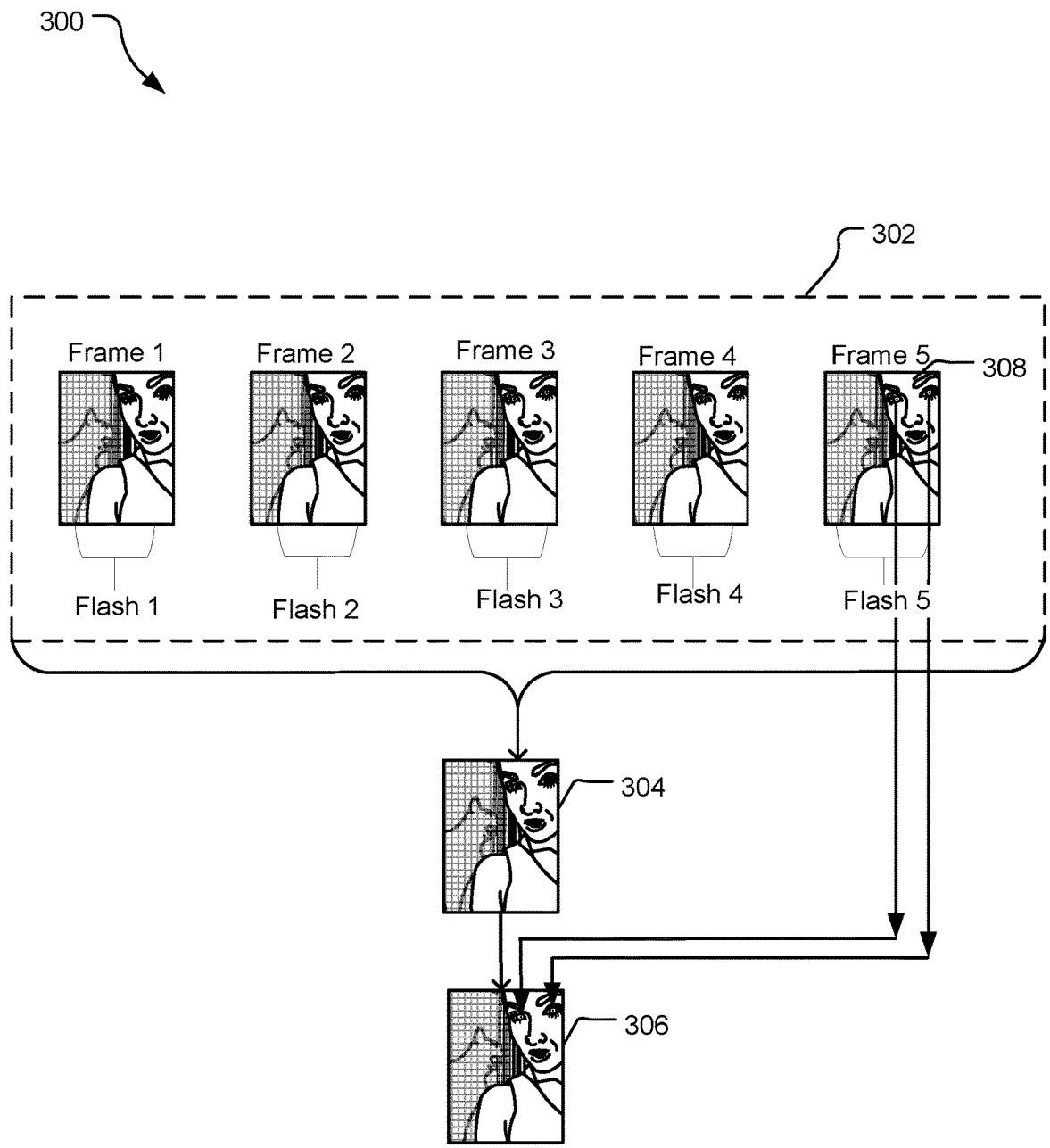
FIG. 3 illustrates operations of another example system for generating a composite image free of flash artifacts from a sequence of images.

FIG. 3 illustrates operations of an example system 300 for generating a composite image based on a sequence of images 302 of a scene captured in rapid succession (denoted Frame 1-Frame 5). In contrast to the example of FIG. 2, the images in the sequence of FIG. 3 are all flash images.

Prior to capturing the sequence of images 302, an image capture controller (not shown) makes an initial determination regarding the use of flash in conjunction with each of the frames. In the example shown, a camera flash is pulsed during exposures capturing each of Frame 1, Frame 2, Frame 3, Frame 4, and Frame 5. Flash may be used in all of the frames of the sequence in this manner when, for example, there are objects in the scene close enough to the camera to be illuminated by flash but none of these objects are so close as to be unnaturally illuminated.

Collectively, the sequence of flashes occurring in conjunction with each of Frames 1-5 have the effect of reducing dilation of a subject's pupil so that flash artifacts distorting the eyes are not present during capture of Frame 5. In some implementations, the sequential flashes (Flash 1, Flash 2, Flash 3, Flash 4, and Flash 5) are of identical brightness values. In other implementations, the sequential flashes are of gradually increasing brightness values. This reduces power consumption during image capture as compared to implementations using flash pulses of equal-brightness. Additionally, pulses of gradually increasing brightness may be less likely to cause a human subject to blink involuntarily during the capture of Frame 5 as compared to implementations using flash pulses of equal brightness.

After capturing the sequence of frames (Frame 1-Frame 5) of the scene, the composite image generator processes the captured frames to generate an intermediate composite image 304. In the example of FIG. 3, the intermediate composite image 304 is constructed based on all of the frames in the sequence (e.g., Frame 1, Frame 2, Frame 3, Frame 4 and Frame 5). In other implementations, the intermediate composite image 304 is based on a subset of the frames in the sequence (e.g., Frames 3, 4, and 5).

In one implementation, creating the intermediate composite image 304 is achieved by implementing a multi-frame de-noise stacking routine to combine two or more of Frames 1-Frames 5, such as a routine that aligns the various frames, combines corresponding pixels from each frame (e.g., by adding, averaging, or scaling), and removes noise. As a result of this stacking, background regions of the intermediate composite image 304 may include better pixel resolution than any individual one of the frames (Frame 1-Frame 4) used in creating the intermediate composite image 304. After creating the intermediate composite image 304, the composite image generator performs additional operations to refine any eyes present in the intermediate composite image 304, ultimately outputting a final composite image 306.

In the final frame (Frame 5) of the sequence of images 302, eyes in the image are most likely be free of flash artifacts due to the repeated flash pulses during prior frames causing a reduction in pupil dilation. The composite image generator therefore identifies the boundaries of eye regions in Frame 5 (e.g., by identifying boundaries of an iris surrounding each pupil) and uses these pixels to overwrite corresponding pixels of the intermediate composite image 304, creating the final composite image 306.

In one implementation, the eye regions in the final composite image 306 have pixel values identical to corresponding pixels values of corresponding eye regions in the last frame (e.g., Frame 5) of the sequence of images 302. In other implementations, eye regions in the final composite image 306 are based on but not identical to the eye regions of Frame 5. For example, the eye regions from Frame 5 may be subjected to additional de-noise and clean-up processing before being inserted to overlie corresponding regions in the intermediate composite image 304.

Figure 4:
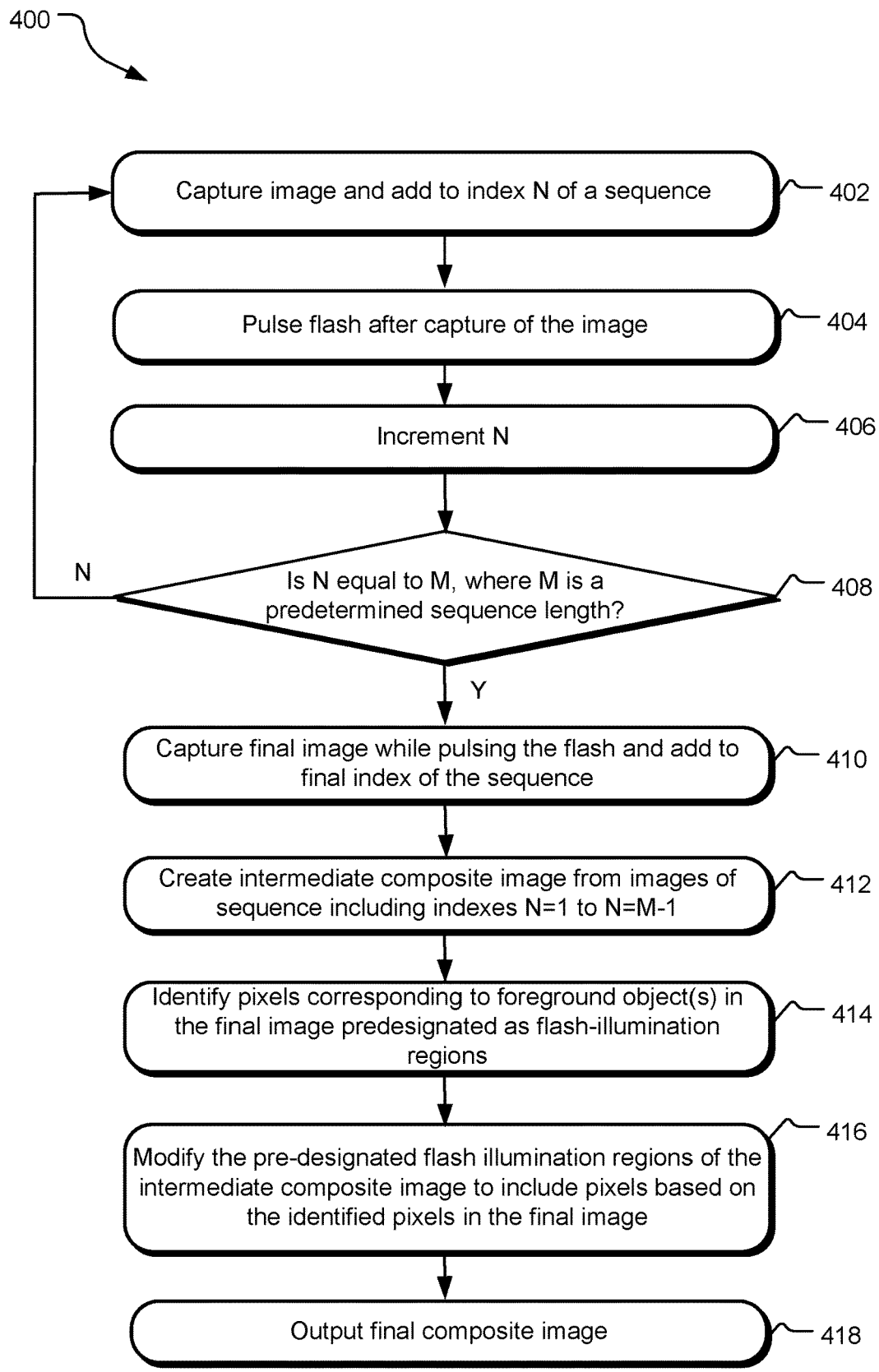
FIG. 4 illustrates example operations for image enhancement and flash artifact removal.

FIG. 4 illustrates example operations 400 for image enhancement and flash artifact removal that may be performed by an image capture device. Prior to the operations 400, the image capture device performs a calibration to determine whether there exist objects in a foreground of a scene that are close enough to be unnaturally illuminated by a camera flash. For example, the image capture device assesses relative distance to different objects in a scene by taking and comparing two calibration images—a non-flash image and a flash image—and observing pixel brightness variabilities. In the scenario represented by the example operations 400, the calibration indicates that there exists at least one object in the foreground of the scene close enough to be unnaturally illuminated by a camera flash (e.g., satisfying a minimum distance threshold). The calibration also indicates that there exists at least one foreground close enough to be illuminated by the flash but not so close as to be unnaturally illuminated. This is an object likely to benefit from flash illumination and the corresponding region is designated as a "flash-illumination region."

Responsive to these determinations, the image capture device enters a mode whereby an image capture operation entails capturing a sequence of images in rapid succession with some images being captured without flash illumination and other images being captured with flash illumination.

In one implementation, this image capture sequence entails operations 402 through 410 of FIG. 4 whereby a capture operation 402 captures a first image and adds the image to an index "N" of a sequence. An illumination operation 404 pulses a flash after the capture operation 402, and an array incrementing operation 406 increments the value of the current sequence index N. A determination operation 408 determines whether the current index N is equal to a predetermined sequence length (M). For example, M may represent 5 or 8 frames. If the current index N is not yet equal to the predetermined sequence length, the capture operation 402, illumination operation 404, and array incrementing operation 406 are repeated to add additional images to the sequence.

When the current index N is equal to the predetermined sequence length M, a final capture operation 410 captures a final image of the sequence while simultaneously pulsing the flash (e.g., the final image of the sequence is a flash image following a series of non-flash images). This final image is added to the sequence.

An image processing operation 412 creates an intermediate composite image from the non-flash images in the sequence at positions from N=0 to N=M−1 (e.g., the second to last image of the sequence). Creation of the intermediate composite image may entail different sub-operations in different implementations including without limitation operations for alignment, stacking, and noise reduction.

An identification operation 414 identifies pixels corresponding to one or more foreground objects in the final frame of the sequence (e.g., the frame at index M) that have been predesignated as "flash-illumination regions." As explained above, a predesignated flash-illumination region is, for example, a region that the image capture devices has identified as likely to benefit from flash illumination. For example, a flash illumination region may include a face, eyes, or other animate or inanimate foreground object that is close enough to be illuminated by the flash but not so close as to appear unnaturally illuminated. For example, a foreground object that is within a threshold distance of a camera may cause a large, unnatural amount of light to reflect back to the camera. Such an object may be excluded from the subset(s) of pixels predesignated as flash-illumination regions.

A modification operation 416 modifies the intermediate composite image to include regions with characteristics based on the identified subset of pixels from the flash-illumination regions of the final image. In one implementation, the modification operation 416 inserts the identified pixels from the final image into the intermediate composite image such that the identified pixels of the final image overwrite corresponding pixels of the intermediate composite image. For example, certain foreground objects (e.g., a face, eyes) in the intermediate composite image are effectively overwritten with pixel values corresponding to like-features in the final image (e.g., taken with flash).

Due to the repeated instances of the illumination operation 404 during initial creation of the sequence of images, eyes present in the pre-designated flash illumination regions are less dilated in the final image than in the initial image of the sequence. The insertion of these "eye pixels" into the intermediate composite image during the modification operation 416 therefore creates a resulting final composite image that is sufficiently free of flash artifacts.

An output operation 418 outputs this final composite image (e.g., the result of the modification operation 416). This image has enhanced background features due to the above-described stacking of frames, some foreground objects reconstructed from non-flash frames, and other foreground objects reconstructed from flash frames that are free of flash artifacts.

Figure 5:
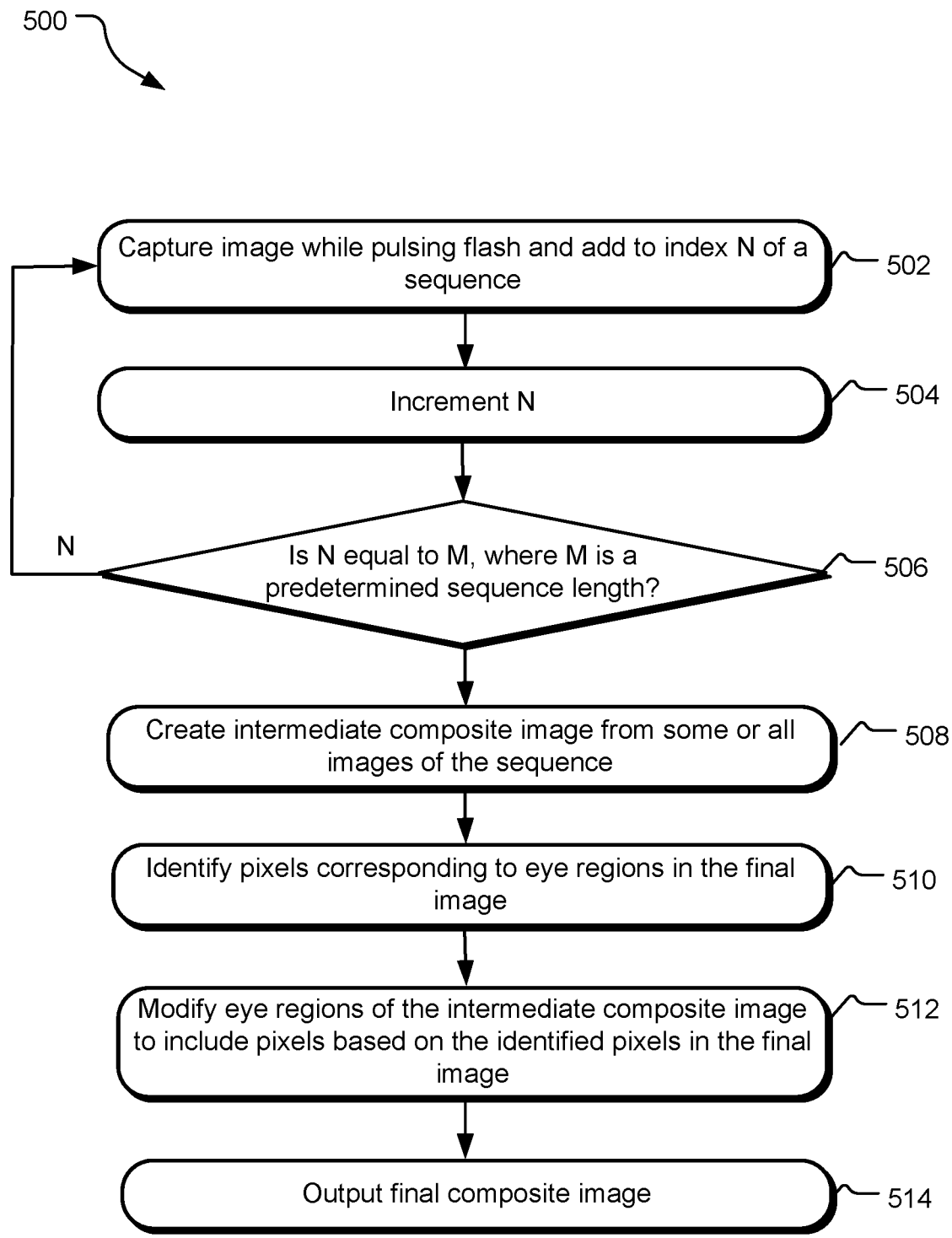
FIG. 5 illustrates other example operations for image enhancement and flash artifact removal that may be performed by an image capture device.

FIG. 5 illustrates other example operations 500 for image enhancement and flash artifact removal that may be performed by an image capture device. Prior to the operations 500, the image capture device performs a calibration to determine whether there exist objects in a foreground of a scene that are close enough to be unnaturally illuminated by a camera flash. The calibration indicates that the scene does not include any foreground objects close enough to be unnaturally illuminated by flash and yet, the scene includes at least one foreground object that may benefit from flash illumination (e.g., the foreground object is further away than a set threshold but still close enough to be illuminated by flash). A region including this object is designated a "flash-illumination region."

Responsive to these determinations, the image capture device enters a mode whereby an image capture operation entails capturing a sequence of images in rapid succession with all images in the sequence captured with flash illumination. In one implementation, this image capture sequence entails operations 502 through 508 of FIG. 5 whereby a capture operation 502 captures a first flash image and adds the image to an index "N" of a sequence. An array incrementing operation 504 increments the value of the current sequence index N, and a determination operation 506 determines whether the current index N is equal to a predetermined sequence length M. For example, M may represent 5 or 8 frames. If the current index N is not yet equal to the predetermined sequence length, the capture operation 502 and array incrementing operation 504 are repeated to add additional images to the sequence.

When the current index N is equal to the predetermined sequence length (M), a creation operation, an image processing operation 508 creates an intermediate composite image from some or all images of the sequence. Creation of the intermediate composite image may entail different sub-operations in different implementations including without limitation operations for alignment, stacking, and noise reduction. In one implementation, the intermediate composite image is created by stacking or otherwise combining corresponding pixels from the different frames.

An identification operation 510 identifies pixels corresponding to "eyes" in the final image. Since the flash has pulsed multiple times prior to the exposure capturing the final image, pupil dilation is reduced in final image as compared to the prior images. As such, the eyes in the final image are free of flash artifacts. An insertion operation 512 inserts the identified eye pixels from the final image to overwrite corresponding pixels of the intermediate composite image, and an output operation 514 outputs a final composite image that has enhanced background features (due to the above-described frame stacking) and eyes that are free of flash artifacts.

Figure 6:
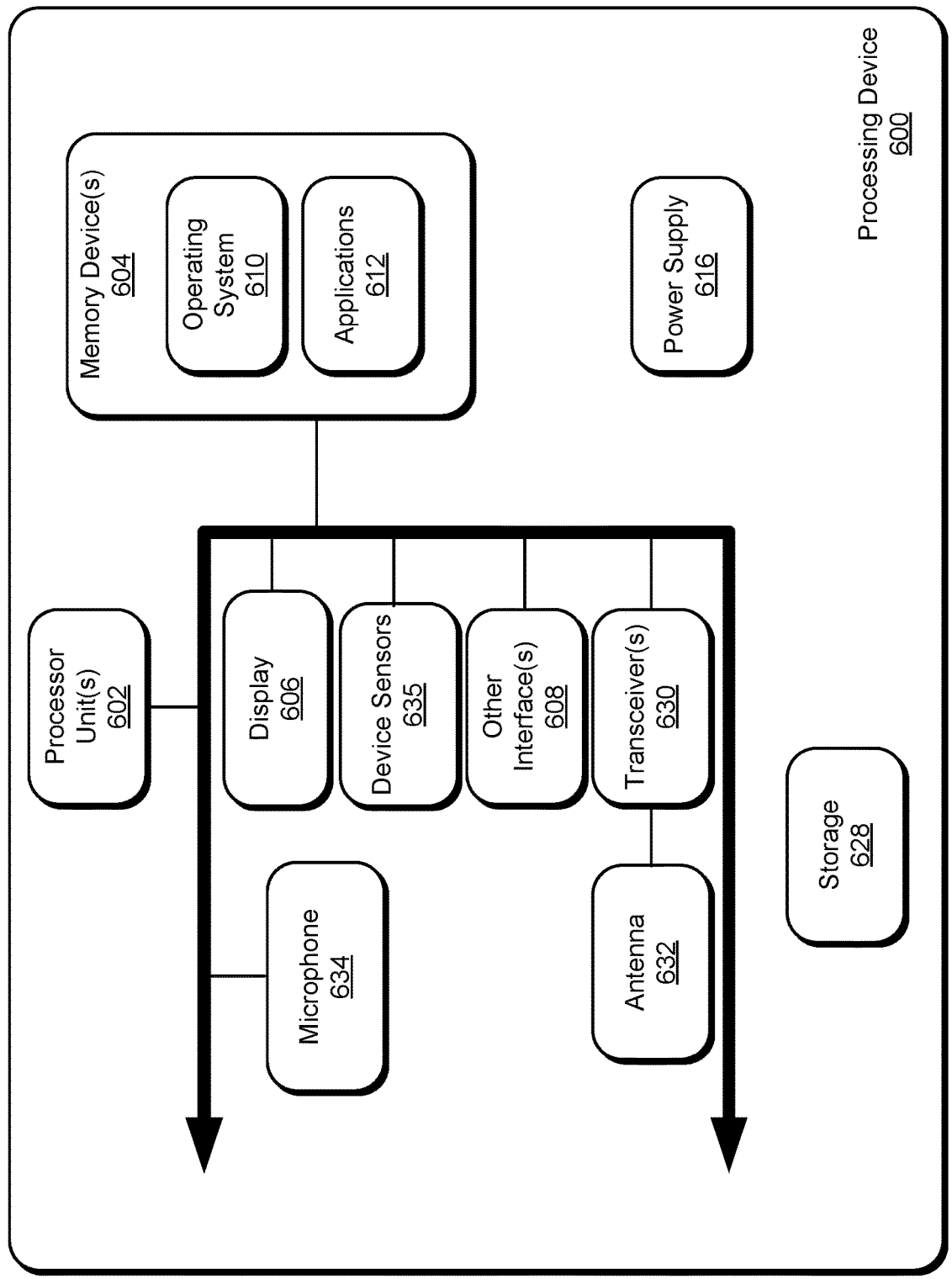
FIG. 6 illustrates an example schematic of a processing device suitable for image enhancement and removal of flash artifacts.

FIG. 6 illustrates an example schematic of a processing device 600 suitable for enhancing background and removing flash artifacts from a captured image. The processing device 600 includes one or more processing unit(s) 602, one or more memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processing unit(s) 602, although other operating systems may be employed.

One or more applications 612, such as an image capture controller or composite image generator are loaded in the memory 604 and executed on the operating system 610 by the processing unit(s) 602. The applications 612 may receive input from the display 606 and/or a device sensors 635 embedded within or beneath the display 606. The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 to provide network connectivity (e.g., a mobile phone network, Wi-Fi®, BlueTooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed. In an example implementation, a mobile operating system, various applications and other modules and services may be embodied by instructions stored in memory 604 and/or storage devices 628 and processed by the processing unit(s) 602. The memory 604 may be memory of host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method includes capturing a sequence of images of a scene over a time interval, pulsing a flash to illuminate the scene multiple times within the time interval, and constructing a composite image of the scene. The composite image includes a first region constructed from a first subset of the images and a second region constructed from a second subset of the images, the first subset of the images captured sequentially after the second subset of images.

In an example method according to any preceding method, the first region is constructed from a last image of the sequence and the second region is constructed from multiple images of the sequence captured prior to the last image.

In another example method according to any preceding method, the first region consists of pixels from a last image of the sequence.

In yet another example method of any preceding method, the first region includes one or more foreground objects.

In still another example method of any preceding method, the first region includes an eye.

In another example method of any preceding, method, the second region includes one or more background objects.

In another example method of any preceding method, pulsing the flash further comprises pulsing the flash at instances in-between image capture of some of the images in the sequence and pulsing the flash at an instance coinciding with image capture of a final image of the sequence.

In still another example method of any preceding method, the flash is pulsed at instances coinciding with image capture of each image of the first subset and each image of the second subset.

In another method of any preceding method, pulsing the flash further comprises increasing intensity of the flash pulses throughout the time interval.

An example system disclosed herein includes an image capture device that images a scene by capturing a sequence of images over a time interval and pulses a flash to illuminate the scene multiple times within the time interval. The system further includes a composite image generator that constructs a composite image including a first region constructed from a first subset of the images captured sequentially after a second subset of the images combined to construct a second region of the composite image.

In yet another example system of any preceding system, the first region is constructed from a last image of the sequence and the second region is constructed from multiple images of the sequence captured prior to the last image.

In still another example system of any preceding system, the first region consists of pixels from a last image of the sequence.

In another example system of any preceding system, the first region includes one or more foreground objects.

In yet another example system of any preceding system, the first region includes an eye.

In another example system of any preceding system, the second region includes one or more background objects.

In still another example system of any preceding system, the image capture device pulses the flash at instances in-between image capture of some of the images in the sequence and pulses the flash at an instance coinciding with image capture of a final image of the sequence.

In another example system of any preceding system, the image capture device is further configured to pulse the flash at instances coinciding with image capture of each image of the first subset and each image of the second subset.

In another example system of any preceding system, the image capture device is configured to increase intensity of the flash pulses throughout the time interval.

In yet another example system of any preceding system, the composite generator is further configured to stack the second subset of images to form an intermediate composite image; detect pixels corresponding to a foreground object in a last image of the sequence; detect pixels in the intermediate composite image corresponding to the foreground object; and replace the detected pixels in the intermediate composite image with the detected pixels from the last image of the sequence.

An example apparatus disclosed herein includes memory; a processor; and an image capture controller, and a composite image generator. The image capture controller is stored in the memory and executable by the processor to capture a sequence of images over a time interval and to control a flash pulse to illuminate the scene at multiple times within the time interval, and the composite image generator is stored in the memory and executable by the processor to construct a composite image including a first region constructed from a first subset of the images captured sequentially after a second subset of the images combined to construct a second region of the composite image.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
   capturing a sequence of images of a scene over a time interval;
   pulsing a flash to illuminate the scene multiple times within the time interval; and
   constructing a composite image of the scene, the composite image including a human or animal subject having a first portion and a second portion,
   the first portion including eyes defined by pixel values constructed from a later-captured subset of the images consisting of images captured sequentially after a prior-captured subset of the images, and the second portion constructed from the prior-captured subset of the images.

2. The method of claim 1, wherein the first portion is constructed from a last image of the sequence and the second portion is constructed from multiple images of the sequence captured prior to the last image.

3. The method of claim 1, wherein the first portion consists of pixels from a last image of the sequence.

4. The method of claim 1, wherein the first portion includes one or more foreground objects.

5. The method of claim 1, wherein the first portion includes an eye.

6. The method of claim 1, wherein the second portion includes one or more background objects.

7. The method of claim 1, wherein pulsing the flash further comprises:
   pulsing the flash at instances in-between image capture of some of the images in the sequence and pulsing the flash at an instance coinciding with image capture of a final image of the sequence.

8. The method of claim 1, further comprising:
   pulsing the flash at instances coinciding with image capture of each image of the first subset and each image of the prior-captured subset of the images.

9. The method of claim 1, wherein pulsing the flash further comprises:
   increasing intensity of the flash pulses throughout the time interval.

10. A system comprising:
    an image capture device that images a scene by capturing a sequence of images over a time interval and pulses a flash to illuminate the scene multiple times within the time interval; and
    a composite image generator that constructs a composite image including a human or animal subject having a first portion and a second portion, the first portion including eyes of the human or animal subject defined by pixel values being constructed from a latter-captured subset of the images consisting of images captured sequentially after a prior-captured subset of the images, the prior-captured subset of the images being combined to construct the second portion of the human or animal subject in the composite image.

11. The system of claim 10, wherein the first portion is constructed from a last image of the sequence and the second portion is constructed from multiple images of the sequence captured prior to the last image.

12. The system of claim 10, wherein the first portion consists of pixels from a last image of the sequence.

13. The system of claim 10, wherein the first portion includes one or more foreground objects.

14. The system of claim 10, wherein the first portion includes an eye.

15. The system of claim 10, wherein the second portion includes one or more background objects.

16. The system of claim 10, wherein the image capture device pulses the flash at instances in-between image capture of some of the images in the sequence and pulses the flash at an instance coinciding with image capture of a final image of the sequence.

17. The system of claim 10 wherein the image capture device is further configured to pulse the flash at instances coinciding with image capture of each image of the first subset and each image of the prior-captured subset of the images.

18. The system of claim 10, wherein the image capture device is configured to increase intensity of the flash pulses throughout the time interval.

19. The system of claim 10, wherein the composite image generator is further configured to:
    combine corresponding pixels from each of the images of the prior-captured subset of images to form an intermediate composite image prior to creation of the composite image;
    detect pixels corresponding to a foreground object in a last image of the sequence;
    detect pixels in the intermediate composite image corresponding to the foreground object; and
    replace the detected pixels in the intermediate composite image with the detected pixels from the last image of the sequence;
    a composite image generator that constructs the composite image.

20. Apparatus comprising:
    memory;
    a processor; and
    an image capture controller stored in the memory and executable by the processor to capture a sequence of images over a time interval and to control a flash pulse to illuminate the scene at multiple times within the time interval; and
    a composite image generator stored in the memory and executable by the processor to construct a composite image including a human or animal subject having a first portion and a second portion,
    the first portion of the human or animal subject including eyes defined by pixel values constructed from a latter-captured subset of the images consisting of images captured sequentially after a prior-captured subset of the images, the prior-captured subset of the images being combined to construct the second portion of the human or animal subject in the composite image.

* * * * *